US009076154B1

(12) United States Patent
Song et al.

(10) Patent No.: US 9,076,154 B1
(45) Date of Patent: Jul. 7, 2015

(54) ADVERTISING IN COLLABORATIVE ENVIRONMENTS

(75) Inventors: Sheng Song, Sunnyvale, CA (US); Jeffrey D. Oldham, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/108,479

(22) Filed: May 16, 2011

Related U.S. Application Data

(62) Division of application No. 12/103,111, filed on Apr. 15, 2008.

(51) Int. Cl.
*G06Q 30/02* (2012.01)

(52) U.S. Cl.
CPC ............ *G06Q 30/02* (2013.01); *G06Q 30/0241* (2013.01); *G06Q 30/0255* (2013.01); *G06Q 30/0277* (2013.01); *G06Q 30/0269* (2013.01)

(58) Field of Classification Search
CPC .......... G06Q 30/0241; G06Q 30/0255; G06Q 30/0277; G06Q 10/107
USPC ......................................................... 705/14
See application file for complete search history.

(56) References Cited

U.S. PATENT DOCUMENTS

| 5,724,567 | A | 3/1998 | Rose et al. | |
|---|---|---|---|---|
| 7,707,226 | B1 | 4/2010 | Tonse | |
| 2003/0149681 | A1 | 8/2003 | Frees et al. | |
| 2003/0195801 | A1* | 10/2003 | Takakura et al. | 705/14 |
| 2004/0078443 | A1* | 4/2004 | Malik | 709/206 |
| 2004/0186766 | A1 | 9/2004 | Fellenstein et al. | |
| 2004/0210634 | A1 | 10/2004 | Ferrer et al. | |
| 2005/0171955 | A1 | 8/2005 | Hull et al. | |
| 2006/0129455 | A1* | 6/2006 | Shah | 705/14 |
| 2006/0156283 | A1* | 7/2006 | Landau et al. | 717/114 |
| 2006/0259357 | A1 | 11/2006 | Chiu | |
| 2006/0259473 | A1* | 11/2006 | Li et al. | 707/3 |
| 2006/0271953 | A1 | 11/2006 | Jacoby et al. | |
| 2006/0294258 | A1* | 12/2006 | Powers-Boyle et al. | 709/246 |
| 2007/0233571 | A1 | 10/2007 | Eldering et al. | |
| 2007/0281689 | A1* | 12/2007 | Altman et al. | 455/435.1 |
| 2008/0065721 | A1* | 3/2008 | Cragun | 705/14 |

* cited by examiner

*Primary Examiner* — John G Weiss
*Assistant Examiner* — Vincent Cao
(74) *Attorney, Agent, or Firm* — Fish & Richardson P.C.

(57) ABSTRACT

A user profile is identified, the user profile including portions of information related to a first user that is present in a collaborative environment. A weight is associated with a portion of information. An advertisement is identified based on the portions of information and associated weights, and the advertisement is shown to the first user.

29 Claims, 8 Drawing Sheets

ADVERTISING IN COLLABORATIVE ENVIRONMENTS

CROSS-REFERENCE TO RELATED APPLICATION

This application is a divisional application of and claims priority to U.S. Ser. No. 12/103,111, filed on Apr. 15, 2008, which is hereby incorporated by reference in its entirety.

BACKGROUND

This document generally relates to information management.

E-mail systems allow people to exchange ideas and collaborate on projects. In some examples, advertisers can send on-line advertisements (or "ads") to viewers in which the ads are selected based on the content of e-mail messages. The selection of ads may be achieved by various techniques. In one example, an initial determination is made to identify all advertisements that are a match or near match for terms in the e-mail. The match may be made, for example, between one or more words in the e-mail, and keywords identified by an advertiser and associated with a particular advertisement or group of advertisements, such as an ad campaign. For example, a company selling fishing tackle may have a line of large lures, and may thus identify terms such as "lunker," "sturgeon," and "muskie fever" as keywords to associate with their advertisements for such large lures. Those advertisements may then be considered by the system for sending to users when the users send or receive e-mails containing such terms. The comparison may also be made between terms in the e-mail, and the text in an advertisement or the text in a target of a hyperlink in an advertisement, or to a combination of keywords, target text, and advertisement text, among other possible techniques. An advertisement may be selected for sending to users if there is a "near" match also, for example, if an e-mail includes terms that are known synonyms or mistypings or misspellings of the keyword terms for an advertisement.

SUMMARY

In general, in one aspect, a user profile is identified, the user profile including portions of information related to a first user that is present in a collaborative environment that enables the first user to interact with at least one other user. A weight is associated with a portion of information. An advertisement is identified based on the portions of information and associated weights, and the advertisement is shown to the first user.

Implementations may include one or more of the following features. The collaborative environment can include an instant messaging interface, a web conferencing interface, an on-line calendar interface, a video conferencing interface, or a Voice-over-IP interface. The collaborative environment can allow the first user to interact with the at least one other user in real time. The advertisement can be updated based on current information about the first user or the at least one other user. The collaborative environment can include an instant messaging interface. Identifying the advertisement can include identifying an advertisement based on the portions of information, the associated weights, and the messages exchanged through the instant messaging interface. Displaying the identified advertisement can include displaying the identified advertisement proximate (e.g., adjacent) to the messages and adjusting a position of the advertisement when the first user scrolls through the messages. Multiple advertisements can be displayed proximate to the messages, and the advertisements are scrolled in response to scrolling of the messages.

The portions of information can include information about the first user, information about other users present in the collaboration environment, information about a relationship between the first user and one or more other users present in the collaboration environment, information about a relationship between the other users present in the collaboration environment, or information about an ongoing collaboration. A time can be associated with each portion of information. A weight can be assigned to each portion of information based on the time associated with the portion of information. The weight assigned to each respective portion of information can be decreased over time.

The weights of the portions of information can be adjusted based on whom the first user interacts with in the collaborative environment. When the first user interacts with a second user in the collaborative environment, the weight of a portion of information that is shared between the first and second users can be increased. When the first user stops interacting with the second user, the weight of the portion of information that is shared between the first and second users can be decreased. Portions of information related to other users whom the first user interacts with in the collaborative environment can be added to the user profile of the first user. When a second user stops interaction with the first user in the collaborative environment, portions of information related to the second user can be removed from the user profile of the first user. Different weights can be associated with a same portion of information for different applications used by the user. When the user is using a first application to interact with a second user, a first weight can be associated with the portion of information, and when the user is using a second application to interact with a second user, a second weight can be associated with the portion of information.

In general, in another aspect, a presence of a first user in a session of a collaborative environment is detected. A user profile associated with the first user is identified, the user profile including information about the first user. An advertisement is identified based on the user profile, and the advertisement is shown to the first user along with a content associated with the session.

Implementations may include one or more of the following features. The user profile can include portions of information about the first user. A weight can be associated with each of the portions of information. Identifying the advertisement can include identifying an advertisement based on the portions of information and associated weights. The advertisement can be updated based on information about the first user or the at least one other user that is collected during the session.

In general, in another aspect, a presence of a first user and a second user in an interactive session of a collaborative environment is detected. A first user profile having information about the first user and a second user profile having information about the second user are identified. An advertisement is identified based on the first and second user profiles, and the advertisement is shown to at least one of the first and second users.

Implementations may include one or more of the following features. The advertisement can be updated based on information about at least one of the first and second users that is collected during the interactive session.

In general, in another aspect, in a collaborative environment that enables a first user to interact with at least one other user, an advertisement is displayed to the first user and the advertisement is refreshed at a rate based on a speed of exchange of information between the first user and another user.

Implementations may include one or more of the following features. The collaborative environment can include an instant messaging interface, a web conferencing interface, an on-line calendar interface, a video conferencing interface, or a Voice-over-IP interface. New advertisements can be provided to the first user faster if the first user changes information with the other user at a faster rate. New advertisements can be provided to the first user faster if the first user responds to messages from the other user quicker.

In general, in another aspect, an advertisement is identified based on portions of information related to a user and time associated with the portions of information, in which information associated with different times are given different weights when identifying the advertisement.

Implementations may include one or more of the following features. More recent information can be given more weight than older information when identifying the advertisement based on the portions of information.

In general, in another aspect, an application server provides a collaborative environment to enable users to interact with one another. A database includes user profiles having a plurality of portions of information related to a plurality of users, each user profile being associated with one of the users, and each portion of information having an associated weight. An ad server identifies an advertisement based on the portions of information related to a first user that is present in the collaborative environment and weights associated with the portions of information.

Implementations may include one or more of the following features. The application server can include an instant messaging server, a web conferencing server, a video conferencing server, an Internet relay chat server, an e-mail server, a calendar server, or a Voice-over-IP server. The ad server can update the advertisement over time based on current information about the first user or at least one other user who interacts with the first user. The application server can include a messaging server, and the ad server can identify the advertisement based on the portions of information, the associated weights, and messages exchanged through the messaging server.

In general, in another aspect, a system includes means for identifying a user profile comprising portions of information related to a first user that is present in a collaborative environment that enables the first user to interact with at least one other user; means for associating a weight with each of the portions of information; means for identifying an advertisement based on the portions of information and associated weights; and means for displaying the identified advertisement to the first user.

These and other aspects and features, and combinations of them, may be expressed as methods, apparatus, systems, means for performing functions, program products, and in other ways.

The aspects, systems, and features disclosed herein may have one or more of the following advantages. Advertisements that are more relevant to users' interests can be identified and presented to the users. Users can receive fresh advertisements based on real-time information, such as real-time chat or instant messaging content.

The details of one or more embodiments of the personal profile feature are set forth in the accompanying drawings and the description below. Other features and advantages of the personal profile feature will be apparent from the description and drawings, and from the claims.

BRIEF DESCRIPTION OF THE DRAWINGS

Like reference symbols in the various drawings indicate like elements.

DETAILED DESCRIPTION

Figure 1:
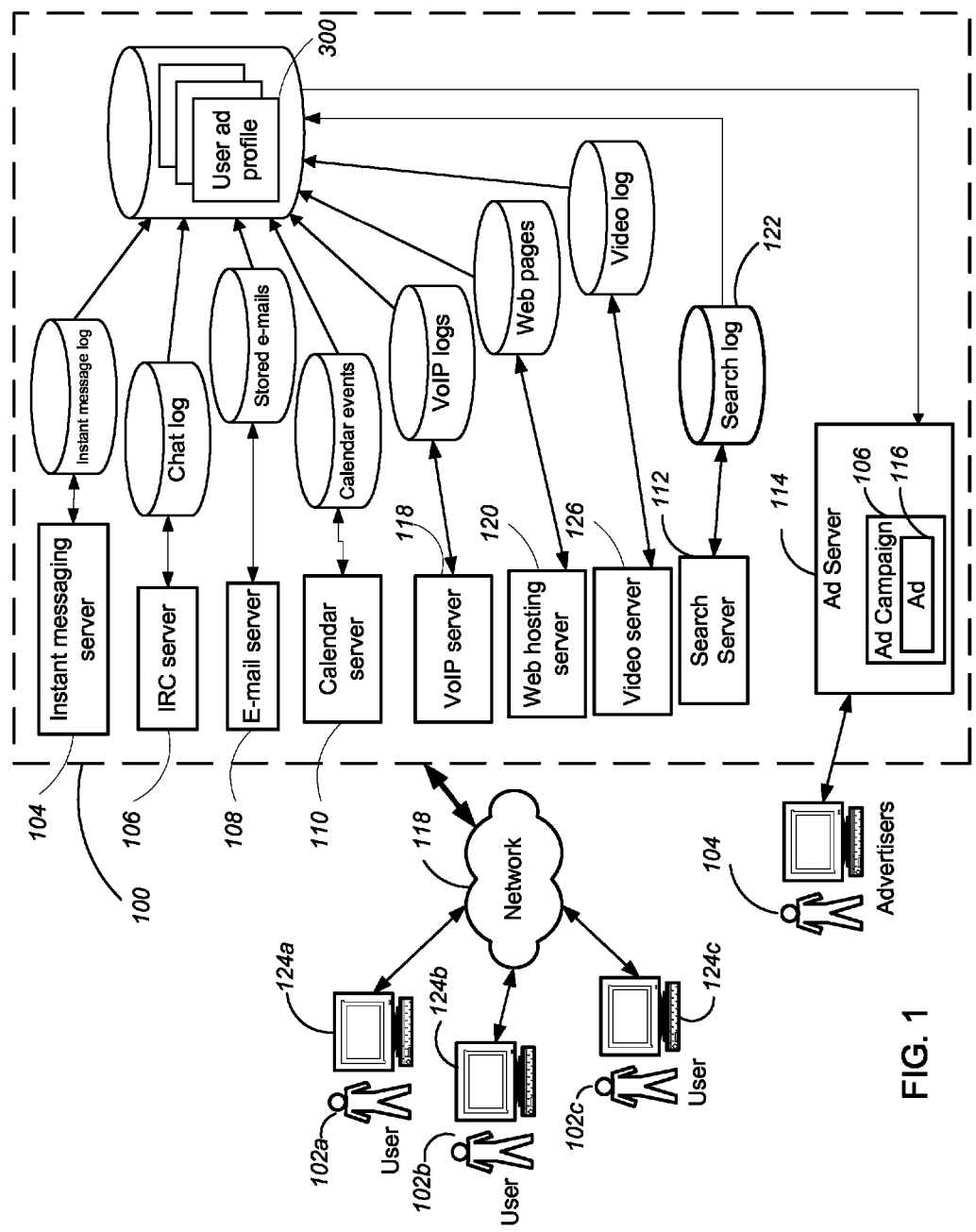
FIG. 1 is a schematic diagram of an example collaboration system.

FIG. 1 is a schematic diagram of a collaboration system 100 that provides several applications, including collaborative applications that allow users (e.g., 102a, 102b, 102c, collectively referenced as 102) to collaborate with one anther, applications that enhance productivity of the users 102, and applications that help the users 102 find and organize information. The system 100 establishes profiles of the users 102 based on information about the users 102, including messages exchanged between the users 102, and selects ads 116 based on profiles of the users 102 so that relevant and useful ads 116 can be delivered to the users 102.

For example, the system 100 may include an instant messaging server 104 to allow users 102 to exchange instant messages, an Internet relay chat (IRC) server 106 to allow users 102 to conduct Internet chat, an e-mail server 108 to allow users 102 to send e-mail messages to one another, and a voice over Internet protocol (VoIP) server 118 to allow users 102 to make phone calls or have video conferences over the Internet. A calendar server 110 allows users 102 to set up calendar events. A search server 112 allows users 102 to search for information. A web hosting server 120 hosts web pages (including web logs, or blogs) of the users 102. A video server 126 delivers shared videos to the users 102. An ad server 114 provides sponsored content (e.g., advertisements, also referred to as "ads" 116) to the users 102. Two or more of the above servers can be combined into one server.

The profiles of the users 102 can be established based on information that the users 102 provided to the collaboration system 100, for example, when the users 102 registered for the services provided by the system 100. The user profiles can also be established based on information (e.g., e-mail or instant messages, or calendar entries) gathered from or otherwise inferred about the users 102 while the users 102 access the services provided by the system 100.

In some implementations, it is important to respect the privacy of the users 102. In these implementations, the collaboration system 100 provides the user 102 with options of enabling or disabling gathering information to support advertisements. For example, the system 100 may provide a user 102a an option to decide whether and which type of messages (e.g., e-mails and instant messages) sent to the user 102a and other users (e.g., 102b and 102c) can be used to determine content (e.g., ads 116) delivered to the other users. A privacy policy can be provided to the users 102 to specify what information is gathered and how the information is used.

The users 102 access the services of the collaboration system 100 through user agents 124a, 124b, and 124c (collectively referenced as 124). The user agents 124a-124c can be, for example, chat application programs, e-mails application programs, or VoIP application programs executing on personal computers, cell phones, and/or personal digital assistants, etc. While only three users 102 and their user agents 124 are shown in the figure, any number of users and user agents may be present.

The collaboration system 100 stores information about the users 102 and documents associated with the users 102 in user profiles 300. For example, the user profiles 300 may store user personal information, such as user name, post office address, and e-mail address. The user profiles 300 may store messages and documents sent from the users 102, including, e-mails, instant messages, and calendar entries. The user profiles 300 may include information about the statuses of the users 102, such as presence information that indicates whether the user is on-line, off-line, away, or busy. The system 100 analyzes the user profiles 300, selects relevant ads 116, and delivers the ads 116 to the user agents 124 to be shown to the users 102. While reference is made to delivering ads, other forms of content or services including other forms of sponsored content can be delivered.

The users 102 are connected to the collaboration system 100 through a network 118, which can be any type of connection suitable for information transfer, including a local area network, a wide area network, an intranet, an extranet, the Internet, or any combination thereof. It is to be understood that while one possible configuration of a collaboration system 100 is shown, other suitable configurations may also be used.

In this document, the definitions of some of the terms are based on RFC 2778 "A Model for Presence and Instant Messaging", February 2000. For example, an instant messaging service may involve the following participants:

Principal: A person in the "real world" who coordinates and communicates with others using the services provided by the collaboration system 100.

Presentity: A presence entity that provides presence information to a presence service.

Presentity principal: A person who provides presence information to a presence service.

Watcher principal: A person who receives presence information from a presence service.

Watcher user agent: A client that the watcher principal uses to receive presence information.

Presence service: A service that accepts, stores, and distributes presence information.

Presence information: Information that is provided by the presentity principals to the presence service to be distributed to the watcher principals.

Instant message: An identifiable unit of data, of small size, to be read by the watcher principal.

The term "ad request" refers generally to an ad client activity that causes one or more ads to be displayed.

A user 102 can be a presentity principal or a watcher principal depending on, e.g., whether the user 102 is sending a message or receiving a message, respectively. The criteria for selecting ads 116 can be mainly based on the information related to the watcher principal since it is the watcher principal who is receiving and viewing information, including ads 116. The watcher user agent used by the watcher principal can be, e.g., an instant messaging application, an e-mail application, or a web browser.

The following describes examples of displaying ads while the users 102 exchange instant messages. In some implementations, the system 100 displays ads 116 to the left or right of instant message lines (the direction in which the user 102 writes the language may influence the choice of left or right). When existing instant message lines scroll, the corresponding ads 116 scroll along with the instant message lines. As new instant message lines appear, new ads 116 appear beside the new instant message lines. Scrolling through the instant message lines will also scroll through the corresponding ads 116. The vertical size of the ads 116 may be one or more lines. In some examples, the size of ads 116 are fixed (e.g., three lines per ad 116). In some examples, different ads 116 can have different sizes.

In some examples, ads 116 can be displayed proximate (e.g., adjacent) to the instant message lines, but the movement of the ads 116 are independent of the movement of the message lines. For example, each ad 116 can be displayed for a predetermined period of time, or for a period of time specified by the sponsor of the ad. This way, the ads 116 remain on the instant message window for a period of time after the users 102 have scrolled through the instant messages.

Ads 116 can be displayed in the presence section of presence and instant messaging services. The presence section refers to the portion of the window that shows the name or identifier of the user 102 participating in the instant message. For example, an ad 116 can appear beside a principal's name or between the principal's name and his status (e.g., active or inactive, on-line or off-line). An ad 116 can appear at the top, bottom, or side of the presence section.

Figure 2:
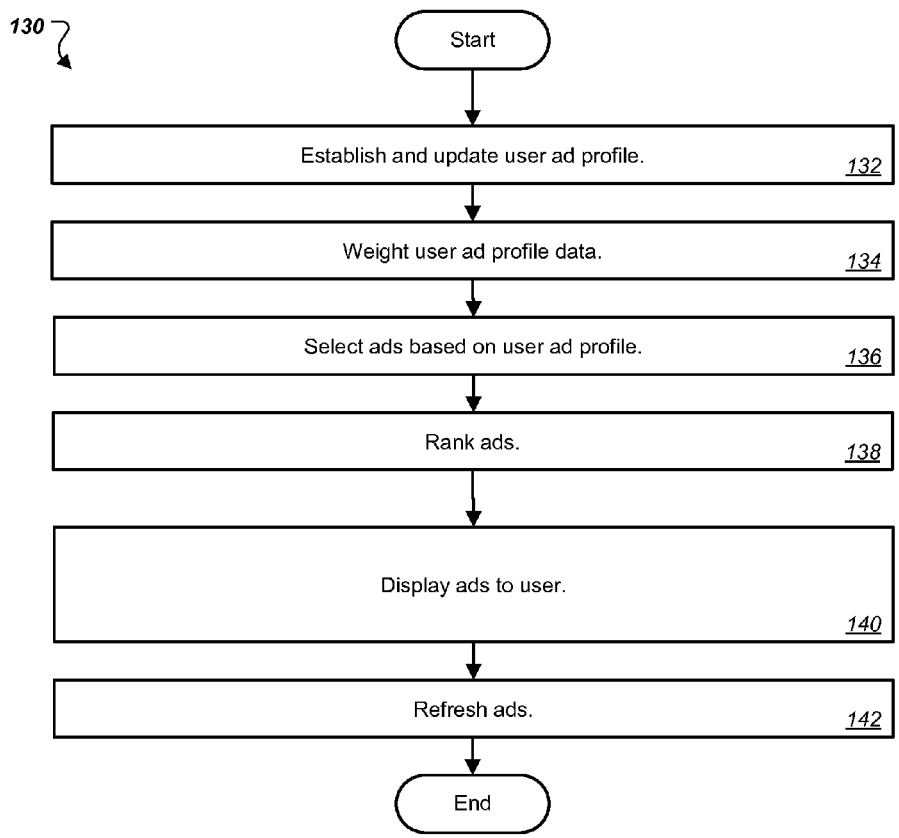
FIG. 2 is a flow diagram of an example process for selecting ads based on a user ad profile.

FIG. 2 is a flow diagram of an example process 130 for selecting and displaying ads 116 to users 102 of the collaboration system 100. The process 130 is shown from the perspective of a single user 102, referred to as the principal user.

In this description, the term "user profile" of a user 102a generally refers to information associated with the user 102a, including information provided to the collaboration system 100 when the user 102a sets up an account, and information gathered by the system 100 as the user 102a interacts with other users (e.g., 102b and 102c). The term "user ad profile" 300 of the user 102a may include the "user profile" of the user 102a, the "user profiles" of other users (e.g., 102b and 102c) who interact with the user 102a, and information about the interaction between the user 102a and the other users.

In step 132, a user ad profile 300 having information about the principal user 102 is established (e.g., by the collaboration system 100). Updates to the user ad profile 300 can be made in real time. The term "real time" means that the user ad profile 300 is updated in a short amount of time after events occur, so that the system 100 can target ads 116 based on the most current information, such as content of an instant message that the principal user 102 recently sent or received. In some implementations, the user ad profile 300 stores information about the principal user's current and previous activities, current and previous collaboration information, and similar information of other users 102. The user ad profile 300 can change according to the presence or absence of other users 102.

The user ad profile 300 can include, e.g., e-mails, chat messages, blogs, web pages, calendar entries, and search histories (e.g., searches for web documents, video, music, and searches on social networking sites) that are associated with the principal user 102. In some implementations, entire e-mails and documents, etc., are stored in the user ad profile 300. The user ad profile 300 can include information about interactions between the media, e.g., e-mails leading to chats, information on current and past activities, geographic location of the principal user, and the local time of the principal user, to name a few examples. The user ad profile 300 can include data that are associated with other users whose presence information is available. Such data may include collaborative data, e.g., shared word processing documents, shared spreadsheets, joint calendar entries, and blogs associated with the other users.

Different pieces of information can be given different weight. For example, documents (e.g., e-mail or instant messages) related to the collaborations with the principal user may be more relevant when selecting ads, and hence given greater weights.

A timestamp is associated with each piece of data in the user ad profile indicating its age, such as for example by the collaboration system 100. The system 100 may assign different weights to data according to the timestamps. For example, for some types of information, a piece of information may be associated with weights that decrease over time. An older chat session may be less relevant than a more recent one. Different types of information may have weights that decrease at different rates. Weights for information obtained from chat messages may decrease at a faster rate than weights for information obtained from e-mail messages.

Privacy settings of the users 102 can be checked before gathering information for purpose of establishing a watcher principal ad profile. For example, when the system 100 detects an e-mail sent to recipients other than the principal user, the collaboration system 100 checks the privacy settings of the other recipients (in addition to that of the principal user) to determine whether including the e-mail in the principal user's ad profile complies with the privacy requirements of the other recipients. If one of the recipients does not wish his information to be used for ad targeting, then the e-mail will not be included in the principal user's ad profile.

In some implementations, the user ad profile 300 preserves the structure of data. For example, when an e-mail is added to the user ad profile 300, the entire e-mail, including the e-mail subject line, e-mail tags or folders, and e-mail sender and recipient lists are preserved in the user ad profile 300, and can later be used in the selection of ads 116. Emoticons (or emotion icons), universal resource identifiers (URIs), and other data can also be preserved and used in the selection of ads 116. For example, when chat messages are added to the user ad profile 300, the names of users participating in the chat sessions and their local times can be preserved in the user ad profile 300.

For example, in the context of instant messaging, the user ad profile 300 includes information about particular situations such as (1) the watcher principal just started using the instant messaging service so there is no previous data, (2) a presentity principal just started using the instant messaging service so there is no previous data, and (3) the watcher and the presentity principal have no previous communications. These situations differ from just lacking information because the absence of communication between two people when it was previously possible differs from the absence of communication when it was not previously possible because they were not participating in the system.

In step 134 of the process 130, the data collected in the user ad profile 300 are assigned weights according to various criteria. In some implementations, each datum (e.g., an e-mail or an instant text message) is given a weight that can be in the range of, e.g., 0.0 to 1.0 for one or more dimensions. The dimensions can include the datum's time, its source, and its collaboration relevance. The weights of various dimensions are later combined into a single numeric value in the range [0.0, 1.0]. The aggregate weights for the important keywords in each datum are computed. For example, keyword weights can be determined using information processing techniques such as word and bigram frequency and statistical improbability.

In some examples, the weight of a datum can be the same regardless of its age. Alternatively, the weight of each datum can be assigned using a number of mathematical models for modeling the decrease in relevance (and therefore weight) over time. For example, more recent information can be weighted higher, and the weight may decrease over time according to a function. Relevance can be modeled as linearly degrading with past events given a lower weight. The slope of the decay can be based on how past data are valued—the greater the downward slope, the less important the past data are valued.

Relevance can be modeled by more complicated functions. For example, relevance may be modeled as exponentially degrading using exponential decay, exponential distribution, or a forgetting curve (Ebbinghaus Curve), and choosing a constant according to how the valuation of the past is viewed. A smaller negative constant is used if past data is more valuable. For example, the following equation can be used to model the exponential decay of relevance R(t) as a function of time t:

$$R(t)=k0*\exp(-k1*t),$$

where k0 and k1 are constants. For example, relevance R(t) can be modeled using the forgetting curve:

$$R(t)=\exp(-t/S),$$

where S is a weight representing a relative strength of retention, and t represents time.

Relevance can be represented using different ranges and scales for weights. For example, a lower weight may be more relevant, or the weight range may be [0.0, +infinity). Weight scales can vary, e.g., linear, exponential, logarithmic, or even binary. For example, a weight of 7 can be ten times more relevant than a weight of 6.

Another weighting technique assumes that relevance may depend on how closely a datum correlates to the current interactive session in time and/or content. The weight of a piece of data can correspond to the correlation between the piece of data and the current interactive session, e.g., documents more relevant to the current chat session can be weighted higher. For example, if the current collaboration is an instant message chat with another user regarding a recent sports event, datum such as e-mails, web pages or past searches including the names of the teams involved may be more relevant.

In some examples, the correlations can be modified (e.g., by exponentiating the correlation values) to make more relevant documents weighted even higher. The system 100 can use a clustering algorithm to form clusters of documents that are related to the current interactive session, and documents with lower correlation to the current interactive session can be given a lower weight or discarded.

Weighting can be based on the source or nature of the datum itself. Data from various sources can be given different weights in the range [0.0, 1.0]. For example, a chat datum might be considered more relevant than a calendar entry for an ad 116 to be delivered alongside a current chat, so the weight of the chat datum may be 0.8 while the weight of the calendar entry may be 0.3.

Weighting may also be based on the users 102 involved in creating a datum. For example, in the context of instant messaging, when choosing an ad to be placed near a watcher principal's displayed presence information, a chat datum from a chat between the watcher principal W and a presentity principal P may be given a higher weight than a chat datum from a chat among the principal users W, P, C, and D, where C and D are other principals. In some examples, chat datum without principal P automatically gets zero weight.

Weighting may also be based on the previous ad events in the user ad profile 300. For example, a user may have never previously clicked on ads for dogs but has clicked on ads for dog food, so dog food ads will be given higher weights than ads for dogs.

The weights for each of the datum dimensions under consideration can be combined into a single weight. For example, the weights can be averaged, their product can be computed, or an L-2 norm (i.e., vector norm) of the weights can be computed.

In step 136 of the process 130, the weighted information is used to select relevant ads 116 from a collection of possible ads. The weighted information in various pieces of datum can be combined to produce a list of relevant words and weights, where a higher weight indicates more relevance to a current interactive session. For example, keywords can be extracted from the pieces of datum using information processing techniques such as statistical improbable phrases and frequent words, bigrams, trigrams, and n-grams. A minimum weight threshold can be used so that words having weights less than the threshold are discarded. In some implementations, the set of all potential ads 116 is filtered to include just ads 116 with keywords having positive weights.

In step 138 of the process 130, the filtered set of ads 116 is ranked based on various criteria, e.g., bids and click-through rates. The weights of the keywords in each ad 116 can be incorporated in the ranking. The highest ranked ads 116 are delivered, e.g., to the principal user's agent 124 and presented to the principal user 102.

The user ad profile 300 may include information about interactions between the principal user 102 and other particular users 102. For example, the user ad profile 300 may store information showing that when the principal user 102a communicates with users 102b and 102c, the topics of discussions are mostly related to computer games and movies, respectively. In this case, when the system 100 detects that the principal user 102a is in current interactive sessions with the user 102b or 102c, the selection of ads can be biased towards ads related to computer games or movies, respectively.

The ad server 114 delivers the identified ads to the users 102 using a number of criteria. For example, in the context of instant messaging, the ads 116 can be delivered to all watcher principals, a maximum number of ads 116 can be delivered to the watcher principals, or the number of ads 116 being delivered can be adaptively determined based on user agents' visibility areas.

In some implementations, such as when a user 102 has just signed up with the collaboration system 100 and its advertisement profile is empty, there may be little or no useful information for selecting ads, so the system 100 does not deliver ads to the user 102 or chooses ads independently of the user 102.

In step 140 of the process 130, chosen ads 116 are shown to the user 102, e.g., via the user agent 124. Ads 116 can be displayed in a number of places during various collaboration activities. The position and content of ads 116 displayed can depend on, e.g., the ongoing activity and the screen layout of the principal user agent.

In step 142, the displayed ads 116 are periodically refreshed to present new ads 116. An interactive application can be executed for a long period of time, even when the user 102 is not actively using the application. For example, an instant messaging window can remain open on the user's chat agent 124 for a long period of time. This gives an opportunity to refresh advertisements displayed on the user agents 124a-124c.

The following describes examples of advertisement refresh and duplication policies. The user agents 124 can issue new ad requests based on a set of criteria or policies. For example, the policies can be based on chat content where a new ad request is generated after every new instant message. The policies can be based on chat rate, i.e., how frequently users exchange messages. For quicker chatters, ads 116 can be refreshed in a quicker fashion.

Some implementations of policies specify that ads 116 be refreshed based on a presence and or status change for one or more of the users 102. For example, a refresh may occur every time a user 102 (in the context of instant messaging, either a presentity principal or a watcher principal) comes online, goes off-line, or has a status change. Some implementations include policies that specify that ads 116 be refreshed based on a change to a user agent window (e.g., minimizing, closing, opening, and/or resizing a window of chat client).

Some implementations of policies specify that ads 116 be refreshed based on changes in the position and grouping of presence information in the user agent. Some implementations of policies specify that ads 116 be refreshed based on time duration, e.g., ads are refreshed every predetermined period of time. Other policies specify that ads 116 be refreshed based on user local time. For example, the local time of the day can trigger refresh of ads, such as meals/movies-related advertisement (e.g., no breakfast ads after 11 am).

When a user agent 124 issues a new ad request to the ad server 114, the ad request can include various information. For example, the ad request can include information about all currently visible ads, each ad being represented by a unique identifier. The ad request may include information about all currently visible ads and the most recent no-longer displaying ads. In the above two examples, the user agent itself does not maintain state information. In some examples, the ad server 114 maintains information on the state of the user agent 124 (which may have a unique ID) and triggers refreshing of ads according to the ad refresh policies and the state information.

For example, state information can indicate the presence or absence of principals, duration of interactions, which collaborative environments are being used by each principal, the activities occurring within each environment, and the activity rates within each environment. There are various ways to refresh ads. For example, ads can be refreshed at a constant rate independent of principal activity, at a rate linear in the principal's activity, or at a rate based on the number of collaborative environments used in a predetermined past period of time. Ads can be refreshed when principals enter or leave the collaborative environment. For example, when a new principal arrives, a new ad can be shown. Ads can be refreshed after an ad click.

The same ads may be shown to different users or to the same user at different times. Examples of ad duplication policies can include one or more of the following:

No duplicate ads may be shown at the same time.

Duplicate ads are permitted.

None of the last k ads served are the same where k is fixed or a function of user agent window size, and k may be greater than the number of ads that can be shown on the screen.

Each advertisement specifies whether it may be shown more than once at the same time.

Figure 3:
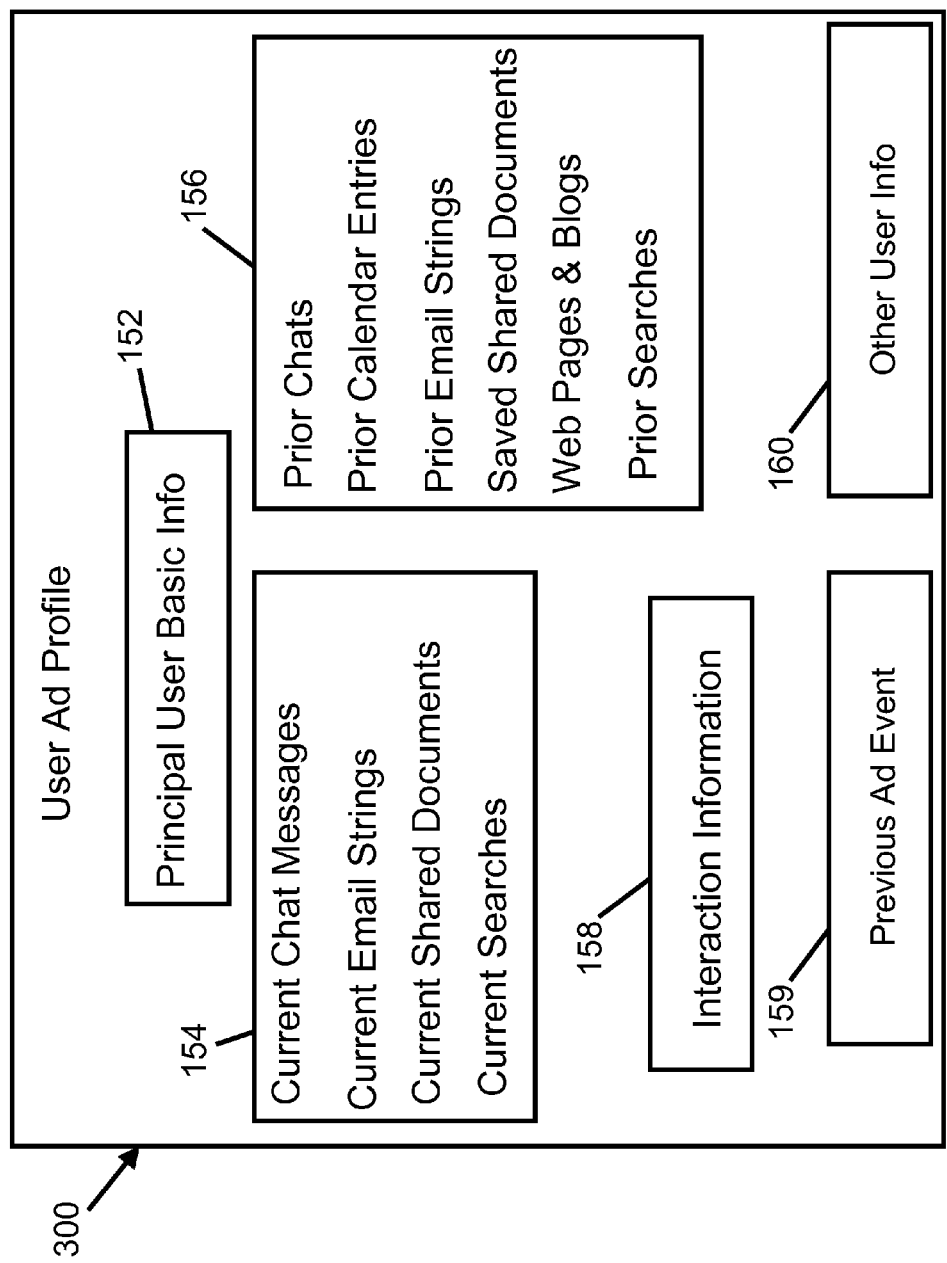
FIG. 3 is a diagram of an example data structure for a user ad profile.

FIG. 3 shows an example data structure for a user ad profile 300 associated with a principal user 102. For example, the user ad profile 300 includes principal user basic information 152, such as name, address, gender, age, local time, etc. The user ad profile 300 may also include information 160 concerning other users 102. The user ad profile 300 can include information about current activities 154, such as current chat messages, current e-mail strings, current shared documents, and current search queries.

The user ad profile 300 can include information about past activities 156, such as previous chat messages, previous calendar entries, and previous e-mail strings. The user ad profile 300 can include saved shared documents, web pages and blogs created by the principal user. The user ad profile 300 can include searches histories (e.g., searches for web documents, video, music, social networking information). The user ad profile 300 may include, for example, information 158 about interactions between the various activities, such as e-mails leading to chats, chats leading to calendar entries or shared documents. Each piece of data may have a timestamp indicating its age.

The user ad profile 300 can include information about previous ad events 159, including ad impressions, clicks on ads, and conversions on ads. Each piece of data may have a timestamp indicating its occurrence.

The user ad profile 300 can be dynamically updated. In some implementations, when the principal user conducts a chat session with other users, the user ad profile 300 can include saved shared documents, web pages and blogs created by the other users. When the chat session with the other users ends, the saved shared documents, web pages and blogs created by the other users can be removed from the user ad profile 300 associated with the principal user. In some implementations, when the principal user conducts a chat session with other users, if the user ad profile 300 already includes documents associated with the other users, the weights for those documents are increased. When the chat session with the other users ends, the documents associated with the other users are decreased. This way, in some implementations, the weights for documents associated with people whom the principal user communicates more often can be higher than documents associated with people whom the principal user communicates less often.

Figure 4:
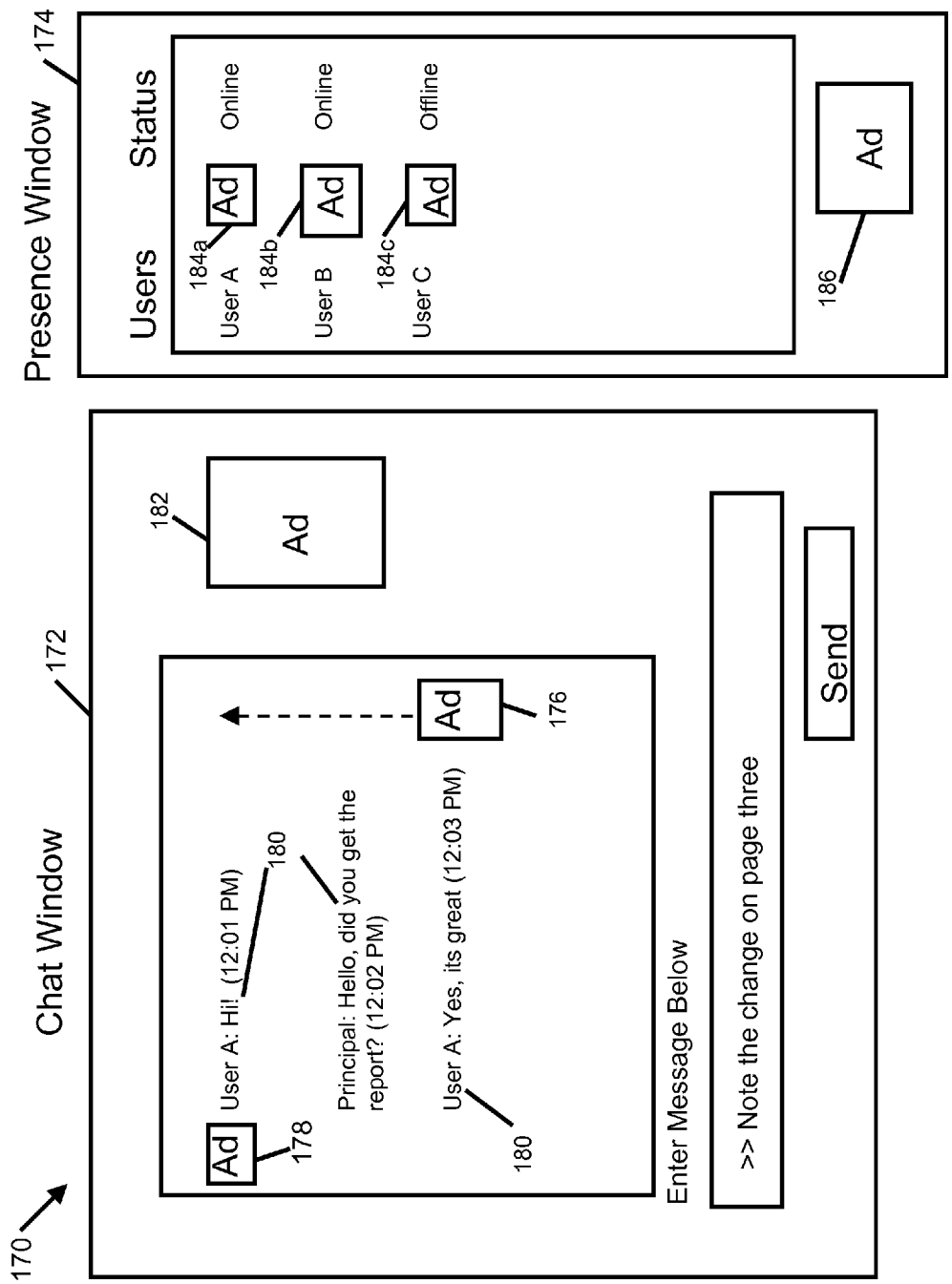
FIG. 4 is a diagram of an example chat client.

FIG. 4 shows an example display for an instant message chat client 170 that includes a chat window 172 and a presence window 174. The dimensions of various portions of the chat window 172 and presence window 174 can be adjusted based on content, and are only an example. Other sizes (relative or otherwise) are possible. The presence window 174 displays information about the users 102 who are participating in the interactive session, including their statuses (online, offline, busy, etc.). The chat window 172 allows the principal user 102 to send and receive instant massages to and from one or more of the other users 102 listed in the presence window 174.

Advertisements, e.g., 176 and 178 can be displayed in the chat window 172 next to the instant message lines 180. In some implementations, as the existing instant message lines 180 scroll, the ad 176 and 178 will correspondingly scroll (indicated by the dashed arrow). In some implementations, as new message lines 180 appear, new ads (not shown in the figure) will appear. In some implementations, scrolling through instant message lines 180 will also scroll through the corresponding ads.

An advertisement 182 can be displayed beside the instant message lines 180 and be independent of the scroll movement of the message lines. The ad 182 may be refreshed so that a new ad appears as the instant message lines 180 scroll, or the ad 182 may remain fixed for a period of time.

Advertisements 184*a*, 184*b*, and 184*c* can be displayed in the presence window 174. For example, the ads 184*a*-184*c* may appear next to the user names and their corresponding statuses. The ads can be chosen based on the watcher principal and other users. For example, the same watcher principal may be chatting with another principal about a recent vacation, another principal about bicycles, and another principal about fishing. The ad next to each principal's presentity can reflect those interests: one concerning travel, one concerning cycling, and one concerning fishing, respectively. Since the watcher principal mentally associates the person with the topic, the corresponding ads are more likely to be effective. An ad 186 can be shown at the bottom of the presence window 174. Ads can also appear elsewhere in the chat window 172 and the presence window 174.

The user ad profile 300 can include information on shared calendar entries and which calendars are displayed. In some implementations, ads 116 can be displayed in shared calendars having events that can be edited and viewed by multiple users 102.

Figure 5:
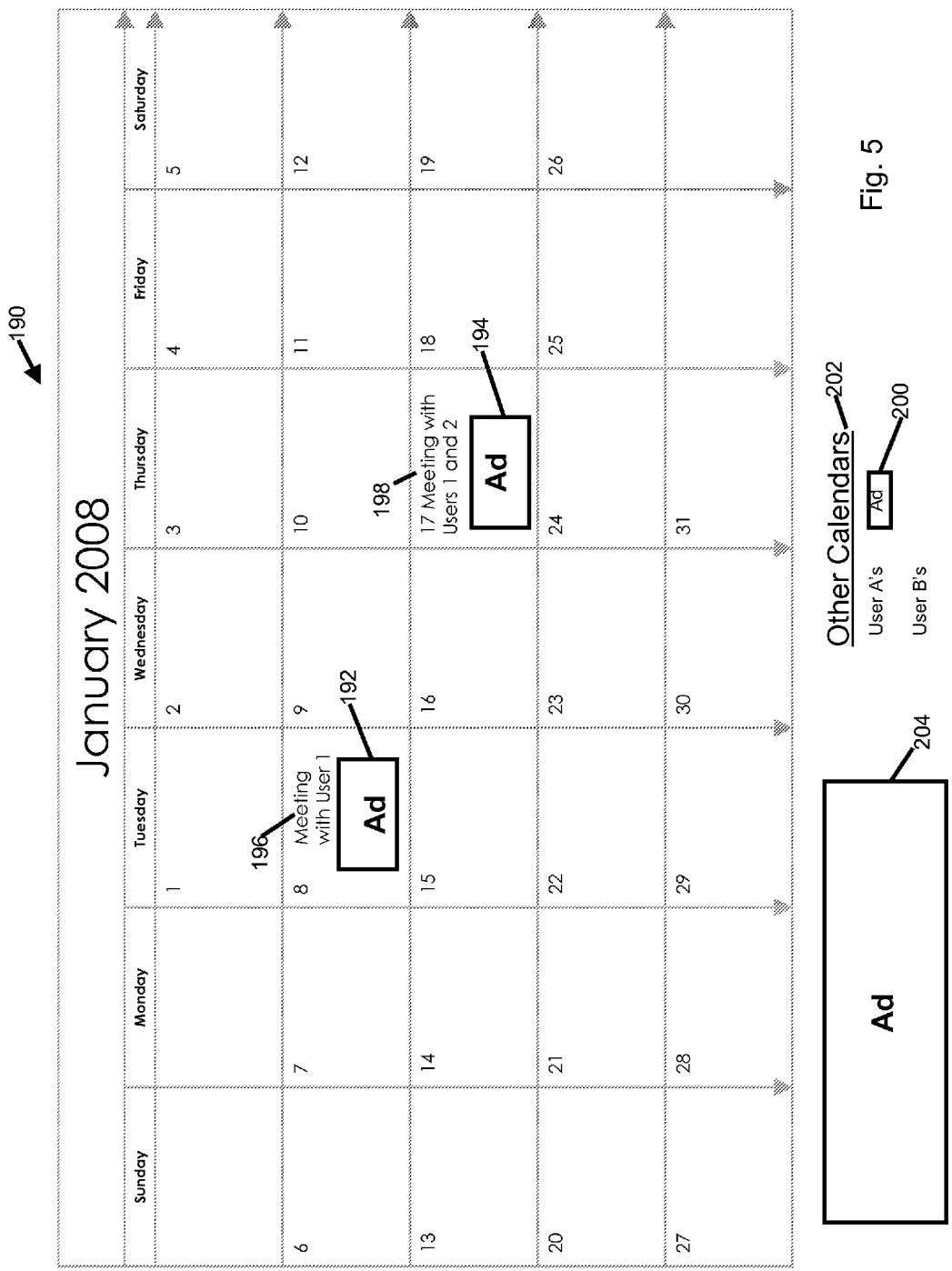
FIG. 5 is a diagram of an example shared calendar.

FIG. 5 shows an example of a principle user's shared calendar 190. For example, ads (e.g., 192 and 194) can be displayed next to calendar entries or events (e.g., 196 and 198). An ad 200 can be displayed beside a list 202 of other user's calendars. For example, one user's calendar may include an event related to a trip to a foreign country, another user's calendar may include an event about a classical music concert, and another user's calendar may include an event related to a professional conference on a renewable energy technologies. The ad next to each principal's presentity can reflect those interests: one concerning travel, one concerning music, and one concerning renewable energy, respectively. Since the watcher principal mentally associates the user with the topic, the corresponding ads are more likely to be effective. Ads (e.g., 204) can be displayed at other blank spaces near the calendar 190.

The selection and ranking of ads 116 for a particular calendar entry can be based on, for example, the calendar event and information about the people who are participating in the event. In some implementations, pieces of information in the user ad profile related to the people who are participating in the event or chose not to participate can be given more weight. In some implementations, pieces of information having timestamps closer in time to the event can be given more weight.

In the example of FIG. 5, an event 196 on January $8^{th}$ involves the principal user and user 1, whereas an event 198 on January $17^{th}$ involves the principal user, user 1, and user 2. In selecting the ad 192 to be displayed adjacent to the event 196 on January $8^{th}$, information in the user ad profile 300 involving only the principle user and the user 1 could be weighted more heavily than data involving user 2 and other users. Information in the user profile data 300 having timestamps on or near January $8^{th}$ can be given more weight than data from other time periods.

The collaborative system 100 can include a video sharing application that allows users 102 to share user-generated video with family and friends. Relevant sponsored content can be provided to viewers of the video based on the content of the video and information about the users viewing the video.

Figure 6:
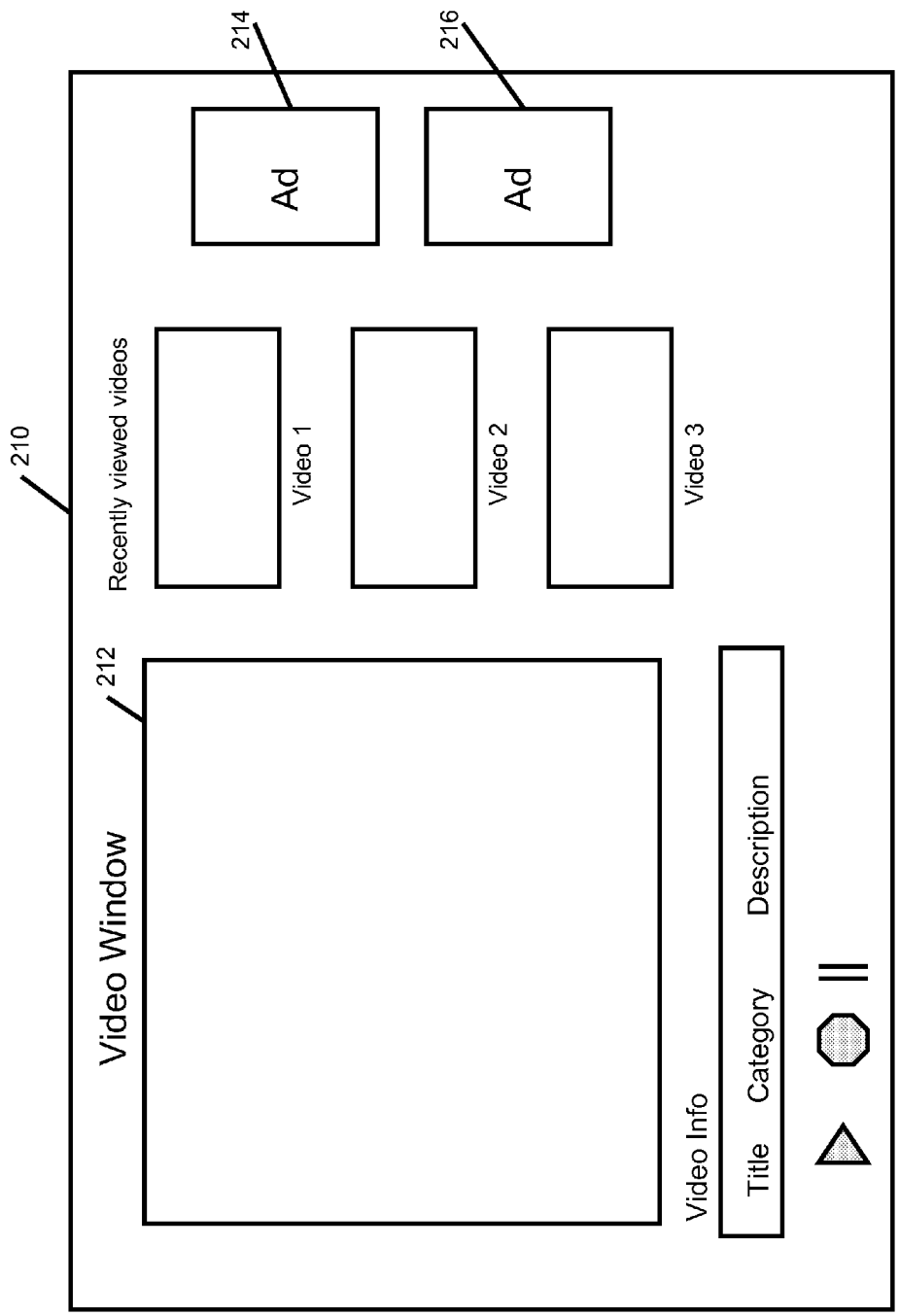
FIG. 6 is a diagram of an example shared video client.

FIG. 6 shows an example of a user interface of a shared video application 210 that allows users to share self-produced video in compliance with relevant copyright laws. A video 218 is shown in a video window 212, and relevant ads 214 and 216 are selected based on information about the video 218 and the user ad profile 300. In this example, the user ad profile 300 can include information about the current and past videos viewed by the user, such as the title, category, and description of the videos. The ads can be refreshed when the user watches another video, be refreshed periodically, or be refreshed after a period of time specified by metadata embedded in the ad.

The user ad profile 300 that is used to assist selection of ads 102 while the principal user is viewing the video 218 includes information, for example, that is gathered by the collaborative system 100 when the principal user is using other applications, such as e-mail and instant messaging applications. By including the user ad profile 300 in the selection of ads, more relevant ads can be identified than using information about the video 218 alone. As mentioned above, in some implementations, the user has the option of turning off the feature of gathering information for purpose of selecting sponsored content.

In some implementations, the information in the user ad profile 300 can be given different weights depending on the current application being used by the principal user. For example, when the principal user is in a chat session with another user, and an instant message line (referred to as msg1) includes the title of a movie, the message line msg1 is a piece of information that is given a weight w1 and stored in the user ad profile 300. Suppose the principal user then uses the shared video application 210 to view a shared video 218. The message line msg1 can be given a weight w2 when used in selecting ads to be shown alongside the video 218, and the weight w2 can be different from w1. When the principal user is chatting with a friend about a movie, he may be less interested in interrupting the chat session to view a movie trailer. However, when the principal user is viewing shared videos, he may be more interested in viewing the movie trailer.

Figure 7:
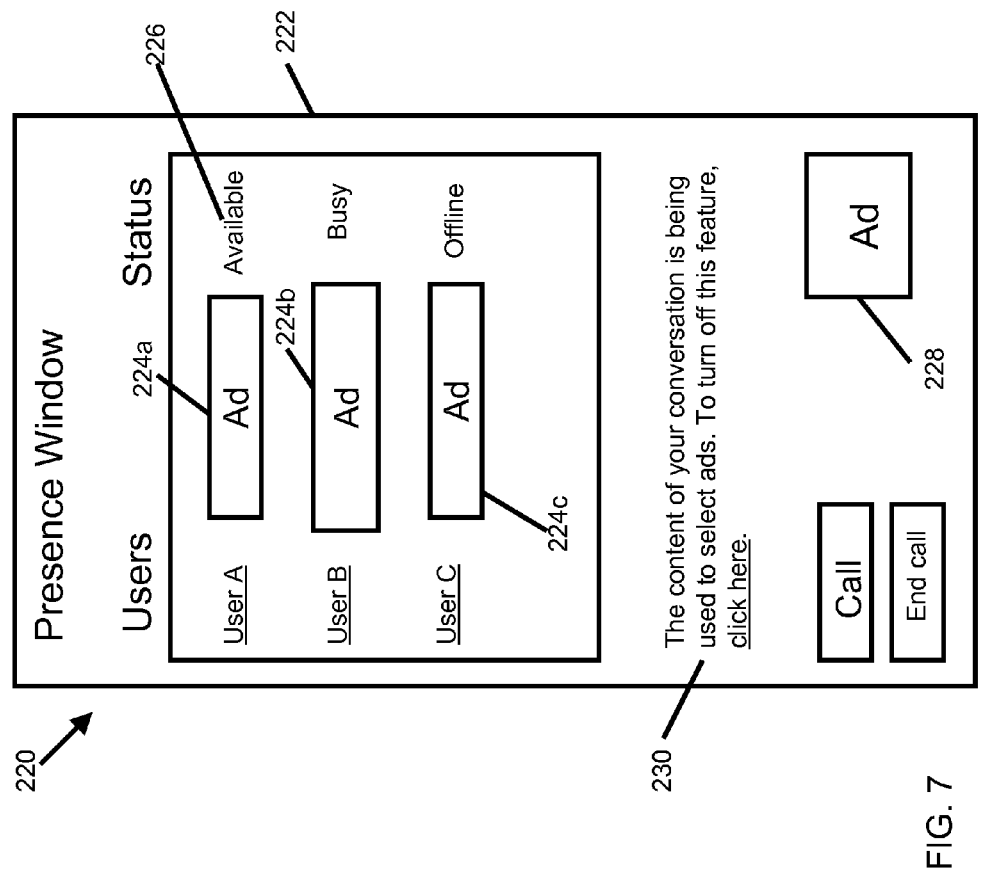
FIG. 7 is a diagram of an example Voice-over-IP client.

FIG. 7 shows an example of a user interface for a voice-over-IP application 220 that includes a presence window 222 for displaying presence information of users. The principal user can select one or more available users from a list of available users to engage in phone conversations. Voice recognition of the conversations can provide user profile information that is similar to the text information provided by instant messages. The recognized speech of the conversations can be added to the user ad profile 300 for use in selecting relevant ads. For example, ads 224a, 224b, and 224c can be displayed near the user status information 226, and an ad 228 can be displayed at a blank space of the presence window 222. The ads 224a, 224b, and 224c can be selected based on information relevant to the users A, B, and C, respectively.

To protect privacy, the presence window 222 shows a message 230 indicating that the conversation is being processed to support display of ads. An option is provided to the user 102 to turn off this feature. In some implementations, a similar message is provided to all participants of the VoIP call to allow any participant to turn off use of the conversation in selecting ads.

Figure 8:
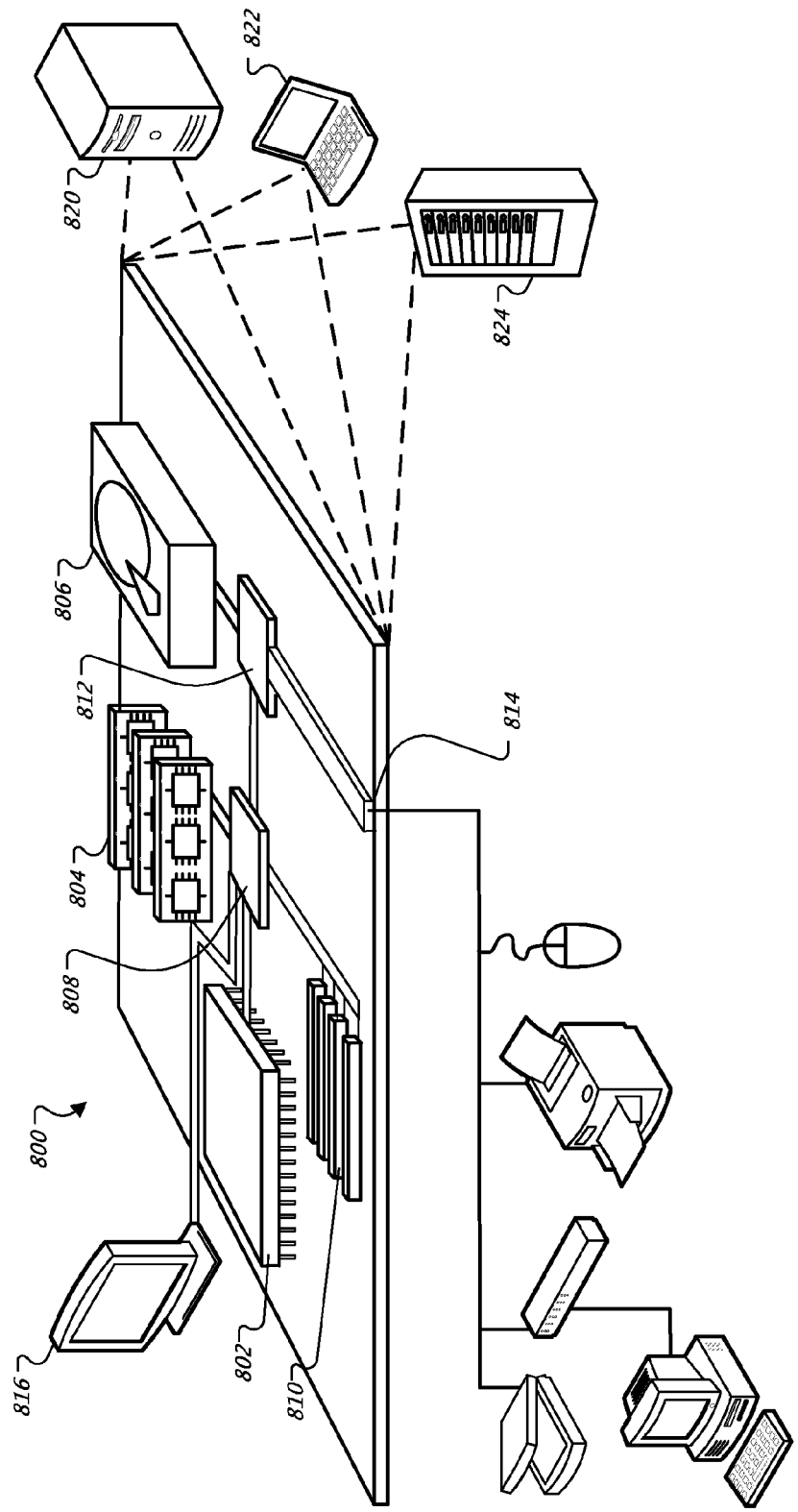
FIG. 8 is a schematic diagram of an example general computer system.

FIG. 8 is a schematic representation of a general computing system 800 that can be used to implement the system 100 or components of the system 100. Computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Each of such devices (e.g., standard server, rack server system, personal computer, laptop computer) may contain one or more of computing device 800, and an entire system may be made up of multiple computing devices 800 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations and examples have been described. Nevertheless, it will be understood that various modifications may be made without departing from the spirit and scope of the invention. For example, various forms of the flows shown above may be used, with steps re-ordered, added, or removed. Also, although several applications and methods have been described, it should be recognized that numerous other applications are contemplated.

For example, when establishing watcher principal ad profiles, the system 100 can extract information from messages and only store the extracted information, rather than the entire message, in the ad profile. For example, instead of storing an entire e-mail in the profile, the system 100 may extract key information from the e-mail and store only the key information in the ad profile. This reduces the amount of storage space for storing watcher principal ad profiles. Examples of the key information in the e-mail include sender name, receiver name, subject line, send date, receive date, date that the e-mail was read, and keywords in the e-mail, etc. Various kinds of servers can be used to provide collaborative environments. For example, a photo server can deliver shared personal photos to the users 102, a music server can deliver shared personal music to the users 102, and a gaming server can allow users to play multi-user games. Advertisements can be identified based on photos being shared, music being shared, or games being played by the users. The system 100 preferably ensures privacy by not collecting or using personally identifiable information when selecting the advertisements.

The process 130 shown in the FIG. 2 does not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer implemented method comprising:
   receiving, from a first computer system, data based on information sent by a first user and by a second user, the information being exchanged in a collaborative environment that enables the first user to interact with at least one other user;
   identifying an advertisement based at least in part on the received data;
   transmitting, by a second computer system, data that causes the first computer system to display, in the collaborative environment, the advertisement to the first user; and
   transmitting, by the second computer system, data that causes the first computer system to refresh the advertisement at a variable rate based at least in part on (i) a speed of exchange of the information and (ii) online status changes of either the first user or the second user, the advertisement being scrolled with a particular portion of the information as additional information is exchanged between the first user and the second user, wherein the advertisement is displayed adjacent to the particular portion of the information.

2. The method of claim 1 wherein the collaborative environment comprises at least one of an instant messaging interface, a web conferencing interface, an on-line calendar interface, a video conferencing interface, or a Voice-over-IP interface.

3. The method of claim 1 in which new advertisements are provided to the first user faster than a refresh rate indicated by an advertisement refresh policy if the first user exchanges information with the other user at a faster rate than an exchange rate indicated by the advertisement refresh policy.

4. The method of claim 1 in which new advertisements are provided to the first user faster than a refresh rate indicated by an advertisement refresh policy if the first user responds to messages from the other user quicker than an exchange rate indicated by the advertisement refresh policy.

5. The method of claim 1 in which the advertisement displayed to the first user is chosen based on the information exchanged between the users.

6. The method of claim 1 in which new advertisements are provided to the first user at a rate that is adjusted upon a change in a rate at which the information is exchanged between the users.

7. The method of claim 1 in which new advertisements are provided to the first user at a rate that is chosen based on an advertisement refresh policy.

8. The method of claim 7 in which the advertisement refresh policy specifies refresh rates for at least one of e-mail and instant messaging.

9. The method of claim 1, wherein the advertisement remains displayed in the collaborative environment while the particular portion of the information is displayed in the collaborative environment.

10. The method of claim 1, wherein the advertisement being paired and scrolled with a particular portion of the information is scrolled independent of a remainder of a user interface containing the collaborative environment.

11. The method of claim 1, comprising:
receiving a request to scroll the information; and
after receiving the request, transmitting data by the first computer system that causes the advertisement to be scrolled with the particular portion of information, wherein the advertisement was removed from view by the additional information.

12. The method of claim 1, wherein transmitting, by the second computer system, data that causes the first computer system to refresh the advertisement at a variable rate based on a speed of exchange of the information comprises:
transmitting data that causes the first computer system to refresh the advertisement at a variable rate further based on the additional information exchanged between the first user and the second user.

13. The method of claim 1, wherein the advertisement is displayed only if the particular portion of the information is displayed.

14. A system, comprising:
a data processing apparatus; and
a memory coupled to the data processing apparatus having instructions stored thereon which, when executed by the data processing apparatus cause the data processing apparatus to perform operations comprising:
receiving data based on information sent by a first user and by a second user, the information being exchanged in a collaborative environment that enables the first user to interact with at least one other user;
identifying an advertisement based at least in part on the received data; and
causing, in the collaborative environment, display of the advertisement to the first user and causing refresh of the advertisement at a variable rate based at least in part on (i) a speed of exchange of the information and (ii) online status changes of either the first user or the second user, the advertisement being scrolled with a particular portion of the information as additional information is exchanged between the first user and the second user, wherein the advertisement is displayed adjacent to the particular portion of the information.

15. The system of claim 14 wherein the collaborative environment comprises at least one of an instant messaging interface, a web conferencing interface, an on-line calendar interface, a video conferencing interface, or a Voice-over-IP interface.

16. The system of claim 14 in which new advertisements are provided to the first user faster than a refresh rate indicated by an advertisement refresh policy if the first user exchanges information with the other user at a faster rate than an exchange rate indicated by the advertisement refresh policy.

17. The system of claim 14 in which new advertisements are provided to the first user faster than a refresh rate indicated by an advertisement refresh policy if the first user responds to messages from the other user quicker than an exchange rate indicated by the advertisement refresh policy.

18. The system of claim 14 in which the advertisement displayed to the first user is chosen based on the information exchanged between the users.

19. The system of claim 14 in which new advertisements are provided to the first user at a rate that is adjusted upon a change in a rate at which the information is exchanged between the users.

20. The system of claim 14 in which new advertisements are provided to the first user at a rate that is chosen based on an advertisement refresh policy.

21. The system of claim 20 in which the advertisement refresh policy specifies refresh rates for at least one of e-mail and instant messaging.

22. A non-transitory computer readable medium storing software comprising instructions executable by a processing device and upon such execution cause the processing device to perform operations comprising:
receiving data based on information sent by a first user and by a second user, the information being exchanged in a collaborative environment that enables the first user to interact with at least one other user;
identifying an advertisement based at least in part on the received data; and
causing, in the collaborative environment, display of the advertisement to the first user and causing refresh of the advertisement at a variable rate based at least in part on (i) a speed of exchange of the information and (ii) online status changes of either the first user or the second user, the advertisement being scrolled with a particular portion of the information as additional information is exchanged between the first user and the second user, wherein the advertisement is displayed adjacent to the particular portion of the information.

23. The computer readable medium of claim 22 wherein the collaborative environment comprises at least one of an instant messaging interface, a web conferencing interface, an on-line calendar interface, a video conferencing interface, or a Voice-over-IP interface.

24. The computer readable medium of claim 22 in which new advertisements are provided to the first user faster than a refresh rate indicated by an advertisement refresh policy if the first user exchanges information with the other user at a faster rate than an exchange rate indicated by the advertisement refresh policy.

25. The computer readable medium of claim 22 in which new advertisements are provided to the first user faster than a refresh rate indicated by an advertisement refresh policy if the first user responds to messages from the other user quicker than an exchange rate indicated by the advertisement refresh policy.

26. The computer readable medium of claim 22 in which the advertisement displayed to the first user is chosen based on the information exchanged between the users.

27. The computer readable medium of claim 22 in which new advertisements are provided to the first user at a rate that is adjusted upon a change in a rate at which the information is exchanged between the users.

28. The computer readable medium of claim 22 in which new advertisements are provided to the first user at a rate that is chosen based on an advertisement refresh policy.

29. The computer readable medium of claim 28 in which the advertisement refresh policy specifies refresh rates for at least one of e-mail and instant messaging.

\* \* \* \* \*